(No Model.)
J. M. KRIESER.
APPARATUS FOR VAPORIZING LIQUIDS.
No. 384,768. Patented June 19, 1888.
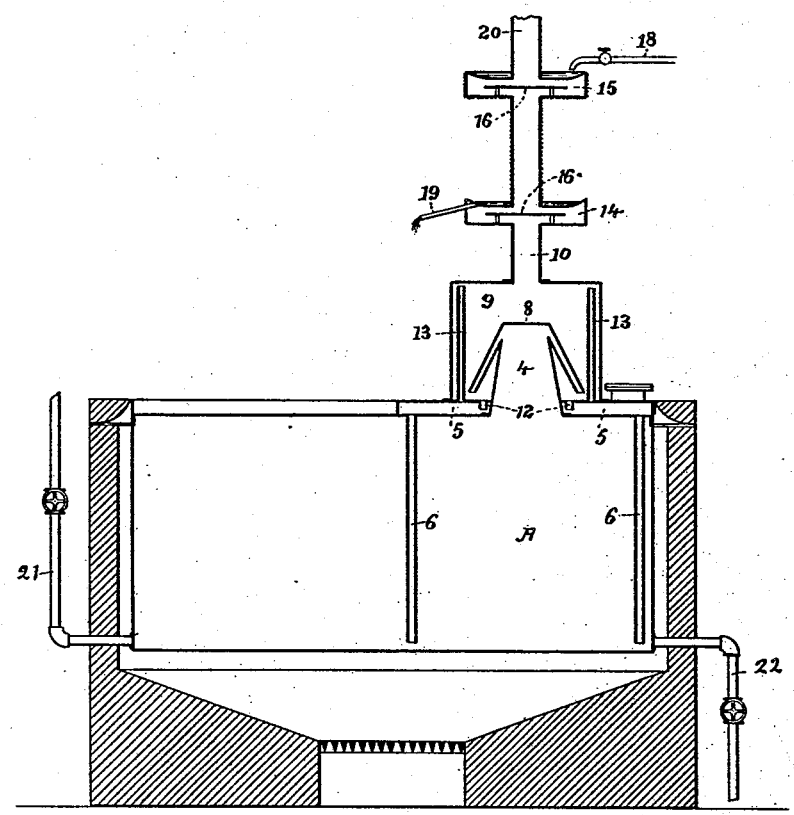
Attest:
Geo. T. Smallwood.
Philip Mauro.
Inventor:
J. Moritz Krieser
By A. Pollok
his atty.

UNITED STATES PATENT OFFICE.

J. MORITZ KRIESER, OF BROOKLYN, ASSIGNOR TO THE MYSTIC OIL COMPANY, OF NEW YORK, N. Y.

APPARATUS FOR VAPORIZING LIQUIDS.

SPECIFICATION forming part of Letters Patent No. 384,768, dated June 19, 1888.

Application filed December 17, 1886. Serial No. 221,889. (No model.)

*To all whom it may concern:*

Be it known that I, J. MORITZ KRIESER, a resident of Brooklyn, in the county of Kings and State of New York, have invented a new and useful Improvement in Apparatus for Vaporizing Liquids, which improvement is fully set forth in the following specification.

The present invention has reference more particularly to the distillation of petroleum, though it is applicable, also, to the distillation or vaporization of other liquids.

The object of the invention is to secure a thorough separation of the oils of different grades by arresting and returning to the still the heavier vapors and particles of liquid in suspension which are carried off with the lighter vapors properly delivered at the various stages of distillation.

Various means and expedients have been devised prior to my invention for arresting and returning the heavier vapors and unevaporated liquids to the still. In most cases such vapors or liquids are composed in part of matters so volatile as to give off light vapors during the period of transit back to the still. Means are provided, as hereinafter explained, for conducting away such vapors and mingling them with the similar vapors passing off from the still.

The invention consists, further, in certain details of construction and arrangements of parts hereinafter set forth.

The accompanying drawing represents in vertical section an apparatus constructed in accordance with the invention.

The still A is provided with a dome, 4, through which pass the vapors rising from the still. Directly above the latter is a shallow vessel or chamber, 5, and above that a vapor-chamber, 9. The dome 4 passes up into the vapor-chamber 9, and is there surmounted by a deflecting-cap, 8, against which the ascending vapors strike, and by which they are deflected downward outside the dome 4 to the bottom of chamber 9. The liquid particles and condensed vapors will collect in the bottom of this chamber, and will flow by the short tubes 12 into the shallow chamber 5, while the lighter vapors ascend in a dry condition through chamber 9 and pass off by pipe 10.

Owing to the proximity of chamber 5 to the still, the heat derived from the latter causes a gentle distillation in said chamber sufficient to separate the light vapors from the heavy vapor and liquid. The pipes 13 conduct away these disengaged vapors to the top of the vapor-chamber 9, whence they pass off through pipe 10. The condensed vapors return by pipes 6 to the still.

Inasmuch as the vapors passing out through the pipe 10 may still contain heavy vapors uncondensed and particles of liquid in suspension, further means for arresting and returning these are desirable. As shown in the drawing, I provide a series of vessels, 14 15, one above another, through which successively the vapors pass. Each vessel has an arresting-plate, 16, placed over the inlet to said vessel. The tops of these vessels are made slightly concave to form traps or basins. A water-pipe, 18, discharges a regulated amount of water into the top trap or basin, and the water overflowing trickles down the outside of vessel 15 into the lower trap or basin, and is conducted away by pipe 19. The temperature of the water is thus raised as it passes from one basin to the next. The effect of the traps or basins with their successive differences of temperature aids materially in arresting the unevaporated liquid and in retarding the denser vapors, and under all conditions the traps or basins contribute to the dryness of the escaping vapor and to the uniformity of the grade delivered at any one period of the distillation. The pipe 21 is for supplying liquid to the still and pipe 22 for drawing off the residuum as may be required.

It is obvious that parts of the invention may be used without the whole, and that modifications in details of construction may be made within wide limits without departing from the spirit of the invention.

I do not claim herein any construction or improvement claimed in my pending application of even date, No. 221,641.

I claim—

1. The combination, with the still, of the shallow chamber above the still and contiguous thereto, the vapor-chamber, the pipe 4, leading from the still to the vapor-chamber, the arresting-cap above pipe for arresting the current of vapor and projecting it downward, the pipes leading from the shallow chamber to the upper part of the vapor-chamber, and the return-pipes leading from the shallow chamber to the still, substantially as described.

2. In a petroleum-distilling apparatus, the combination of the still, the dome or discharge-pipe, the shallow chamber above the still, the vapor-chamber above the shallow chamber, the pipes leading from the shallow chamber to the top of the vapor-chamber, means, such as the arresting-cap 8 and return-pipes 12 and 6, for arresting and returning the principal portion of the heavy vapors and unevaporated liquid, the series of vessels having concave tops and level rims, forming basins or traps, arranged one above the other, so that water overflowing the top basin will trickle down the sides of the vessel and the intervening pipe to the next beneath, a pipe for flowing cold water on to the upper trap, and a pipe for carrying it away from the lower one, substantially as described.

In testimony whereof I have signed this specification in the presence of two subscribing witnesses.

J. MORITZ KRIESER.

Witnesses:
PHILIP MAURO,
A. POLLOK.